United States Patent

Freeland et al.

[11] Patent Number: 5,148,473
[45] Date of Patent: Sep. 15, 1992

[54] PAGER AND RADIOTELEPHONE APPARATUS

[75] Inventors: Joseph C. Freeland, Lindenhurst; David M. Hess, Elgin, both of Ill.

[73] Assignee: Motorola, Inc., Schaumburg, Ill.

[21] Appl. No.: 773,759

[22] Filed: Oct. 15, 1991

Related U.S. Application Data

[63] Continuation of Ser. No. 575,473, Aug. 30, 1991, abandoned.

[51] Int. Cl.⁵ .............................................. H04M 11/00
[52] U.S. Cl. ....................................... 379/59; 379/58; 379/57
[58] Field of Search ..................... 379/57, 58, 59, 61; 340/825.44

[56] References Cited

U.S. PATENT DOCUMENTS

| | | | |
|---|---|---|---|
| 4,412,217 | 10/1983 | Willard et al. | 340/825.44 |
| 4,575,582 | 3/1986 | Makino. | |
| 4,713,808 | 12/1987 | Gaskill et al. | 340/825.44 |
| 4,747,122 | 5/1988 | Bhagat et al. | 379/57 |
| 4,979,205 | 12/1990 | Haraguchi et al. | 379/61 |
| 5,040,204 | 8/1991 | Sasaki et al. | 379/61 |

FOREIGN PATENT DOCUMENTS 0212761 3/1987 European Pat. Off. .
63-224422 9/1988 Japan .

OTHER PUBLICATIONS

Financial Times article, "Designs on Pocketing the Cellular Market", by Geoffrey Charlish, Dec. 11, 1987.
Published German Application DE3329267, by Künzel, Feb. 1985 (379-58).

Primary Examiner—James L. Dwyer
Assistant Examiner—Dwayne D. Bost
Attorney, Agent, or Firm—Kenneth W. Bolvin

[57] ABSTRACT

The present invention encompasses a pager and radiotelephone apparatus (100) having a radio pager section (102) and a cellular radiotelephone section (104) into one unit. The apparatus (100) may automatically receive a plurality of pages while the cellular radiotelephone section (104) is on, communicating a cellular telephone call, or off and unattended. The received pages are stored in the pager section (102) until the apparatus user acknowledges their receipt by a keystroke. The pages are then transferred to the radiotelephone section (104) and stored in non-volatile memory for later use.

5 Claims, 3 Drawing Sheets

PAGER AND RADIOTELEPHONE APPARATUS

This is a continuation of application Ser. No. 07/575,473, filed Aug. 30, 1991 and now abandoned.

FIELD OF THE INVENTION

The present invention relates to both the paging industry and the cellular radiotelephone industry.

BACKGROUND OF THE INVENTION

Paging systems are typically one way radio communication systems. An individual wishing to communicate with a pager user usually calls a central telephone number to access the central paging control. The central paging control can be either automatic or operated by a human operator. If automatic, the caller keys in the number assigned to the individual pager they wish to reach. Once that pager is accessed, the caller can either leave a voice message for the paged individual or key in the telephone number to be displayed on the pager's display. Some systems may also allow both types of paging.

If the central paging control is operated by a human operator, the caller typically tells the operator the number of the pager and the message. The operator then pages the individual, and relays the message when the paged individual calls the operator.

Once paged, the individual must find a telephone to answer the page. This problem can be solved by the paged individual carrying a cellular radiotelephone. The radiotelephone allows a mobile user to make or receive a call anywhere within an area covered by the cellular communications system antennas.

One problem with radiotelephone communication is that the radiotelephone user typically pays for incoming as well as outgoing calls. If an unwanted call is made to the radiotelephone, therefore, the radiotelephone user must pay for it at much higher rates than receiving a page. The pager, therefore, allows the called party to screen incoming calls to determine which telephone number to call back, thereby eliminating the charges for unwanted calls.

While the pager solves some of the limitations of the cellular radiotelephone and vice versa, this creates the problem of carrying two communication devices to remain in contact while moving about an area. There is a need therefore for a single device combining the advantages of both the cellular radiotelephone and the pager.

SUMMARY OF THE INVENTION

The present invention encompasses a pager and radiotelephone apparatus combining a radio pager and a cellular radiotelephone into one unit, which may automatically receive a plurality of pages while the cellular radiotelephone is on, communicating a cellular telephone call, or off and unattended.

DESCRIPTION OF A PREFERRED EMBODIMENT

Figure 1:
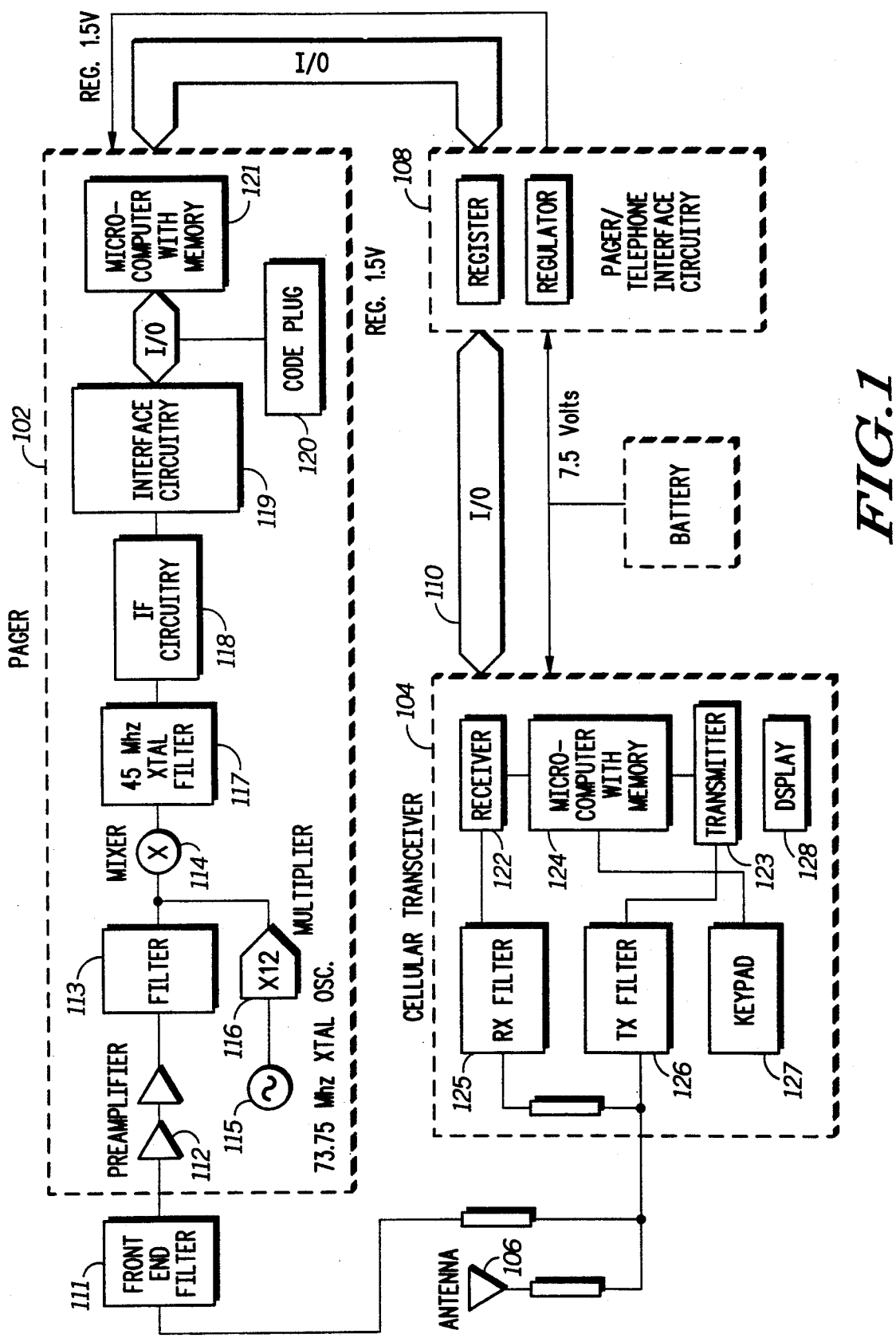
FIG. 1 shows a block diagram of a pager and radiotelephone apparatus embodying the present invention.

The radiotelephone and pager apparatus, illustrated in FIG. 1 and embodying the present invention, combines a radio pager section (102) and a cellular radiotelephone section (104) into one small, lightweight unit. An example of a radio pager (102) is the pager shown and described in Motorola instruction manual number 68P81006B85-O, entitled "BRAVO SERIES Numeric Display Pagers A05JRB/C Models 929–932 MHz", and the pager shown and described in Motorola instruction manual number 68P81044C10-A, entitled "SENSAR SERIES GSC Display Radio Pagers A05JRB/C Models 450–470 MHz". An example of a radiotelephone (104) is the portable radiotelephone shown and described in Motorola instruction manual number 68P81054E60-0, entitled "DYNATAC Cellular Portable Telephone". All of these instruction manuals are published by and available from Motorola C & E Parts, 1313 East Algonquin Road, Schaumburg, Ill. 60196.

A single antenna (106) is shared by both the pager section (102) and radiotelephone section (104). The antenna (106) is coupled via microstrip transmission lines to receive (125) and transmit (126) filters in the radiotelephone section (104) and a front-end receive filter (111) in the radio pager section (102).

A received signal, with a 930 MHz frequency in the preferred embodiment, from the front-end filter (111) is amplified by the preamplifier (112) and filtered by the filter (113) in the pager section (102). A 73.75 MHZ crystal oscillator (115) signal is multiplied by twelve in multiplier (116) resulting in an 885 MHz injection signal that is mixed in mixer (114) with the 930 MHZ signal from the front-end filter (111), resulting in a 45 MHz signal. A 45 MHz crystal filter (117) attenuates the signal above and below the 45 MHz RF carrier and the resulting signal is demodulated into a 455 kHz signal by the intermediate frequency circuit (118). This signal is then input to an interface circuit (119) in the pager section (102).

The interface circuit (119) of the pager section (102) interfaces the input signal to the microcomputer (121) in addition to squaring up the signal and providing power regulation for the rest of the pager section (102). The microcomputer (121) contains a stack for storage of the incoming pages. In the preferred embodiment, the microcomputer (121) is capable of storing ten telephone numbers, although any number of telephone numbers maybe stored by changing the size of the stack. The microcomputer (121) also controls the pager section (102). Non-volatile memory, also known in the art as a code plug (120), has the identification number assigned to that particular pager section (102) in addition to the options available for the pager. Paging signals or pages transmitted to the pager section (102) include the identification number and a telephone number. Each time the pager section (102) is turned on, the microcomputer (121) reads the data stored in the code plug (120) and uses the read-out identification number to select its pages received on the 930 MHz paging channel.

Figure 3:
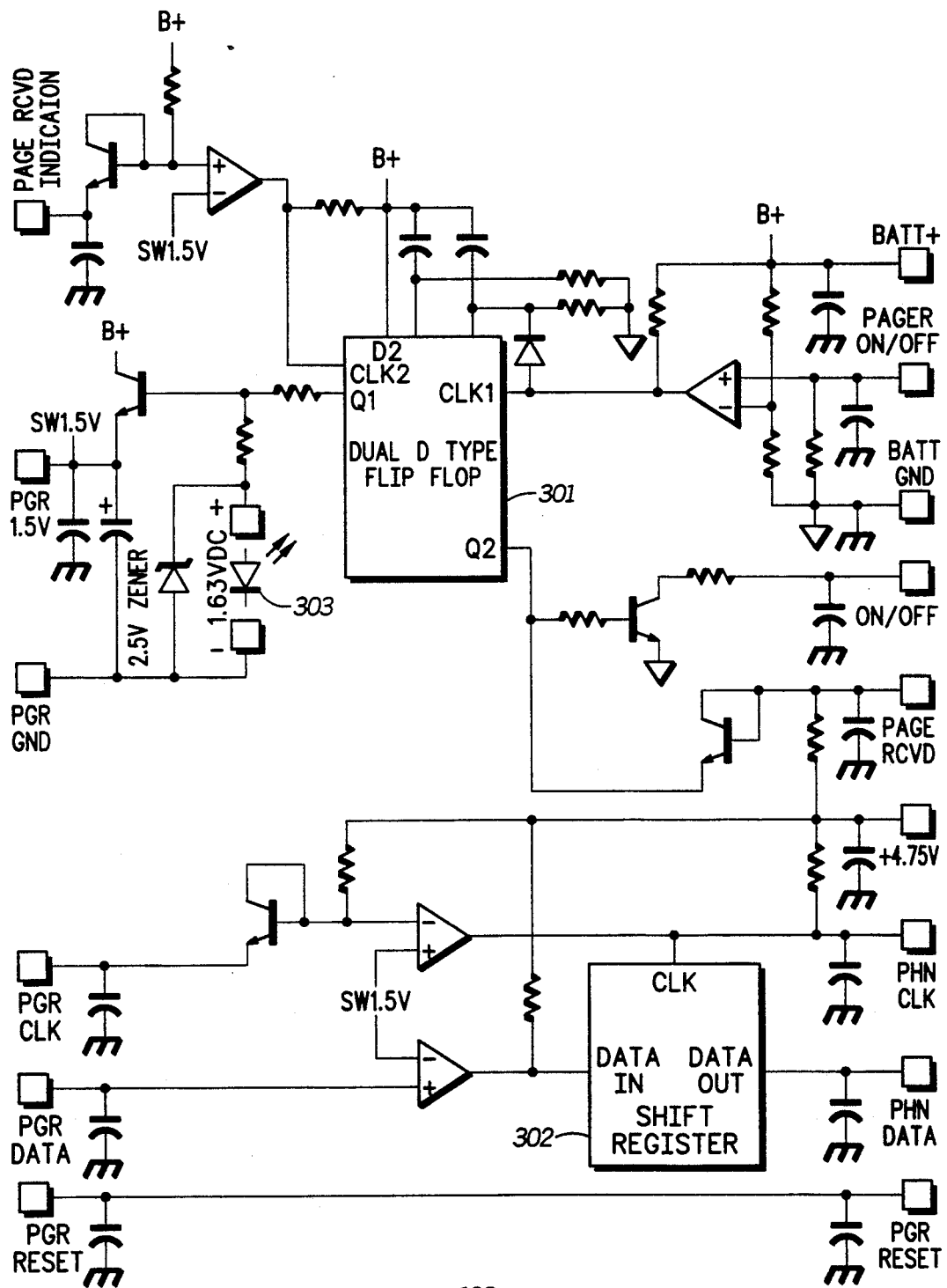
FIG. 3 shows a schematic of the interface circuitry 108 of the pager and radiotelephone apparatus in FIG. 1.

The pager/telephone interface circuitry (108), illustrated in FIG. 3, interfaces the pager section (102) to the radiotelephone section (104). This circuitry contains a 128-bit shift register (302), a Motorola-type MC14517B integrated circuit, to store pages from the pager, and a dual D-type flip flop, a Motorola-type MC14013BD integrated circuit, to control the power state of the pager section (102). This flip flop is also used by the pager section (102) to give a page received indication to the radiotelephone section (104). In addition, the power-on LED (303) for the pager section (102) is also contained in this interface (108).

The radiotelephone section (104) is comprised of a receiver (122) and transmitter (123) controlled by a microcomputer (124), a Motorola-type 68HC11 microcomputer in the preferred embodiment. The microcomputer (124) is also coupled to the display (128) for displaying telephone numbers and status messages, and to the keypad (127) having numeric pushbuttons for dialing phone numbers and function pushbuttons, such as recall, clear and send pushbuttons, for controlling operation of radiotelephone section (104). An I/O bus (110) couples the radiotelephone's microcomputer (124) to the pager/telephone interface circuitry (108). The receive filter of the radiotelephone section (104) is coupled to the radiotelephone receiver (122). A radiotelephone call signal that is received by the receiver (122) is routed to the microcomputer (124) for processing. A radiotelephone call to be made by the radiotelephone section (104) is routed by the microcomputer (124) to the transmitter (123) that is coupled to the transmit filter.

Figure 2:
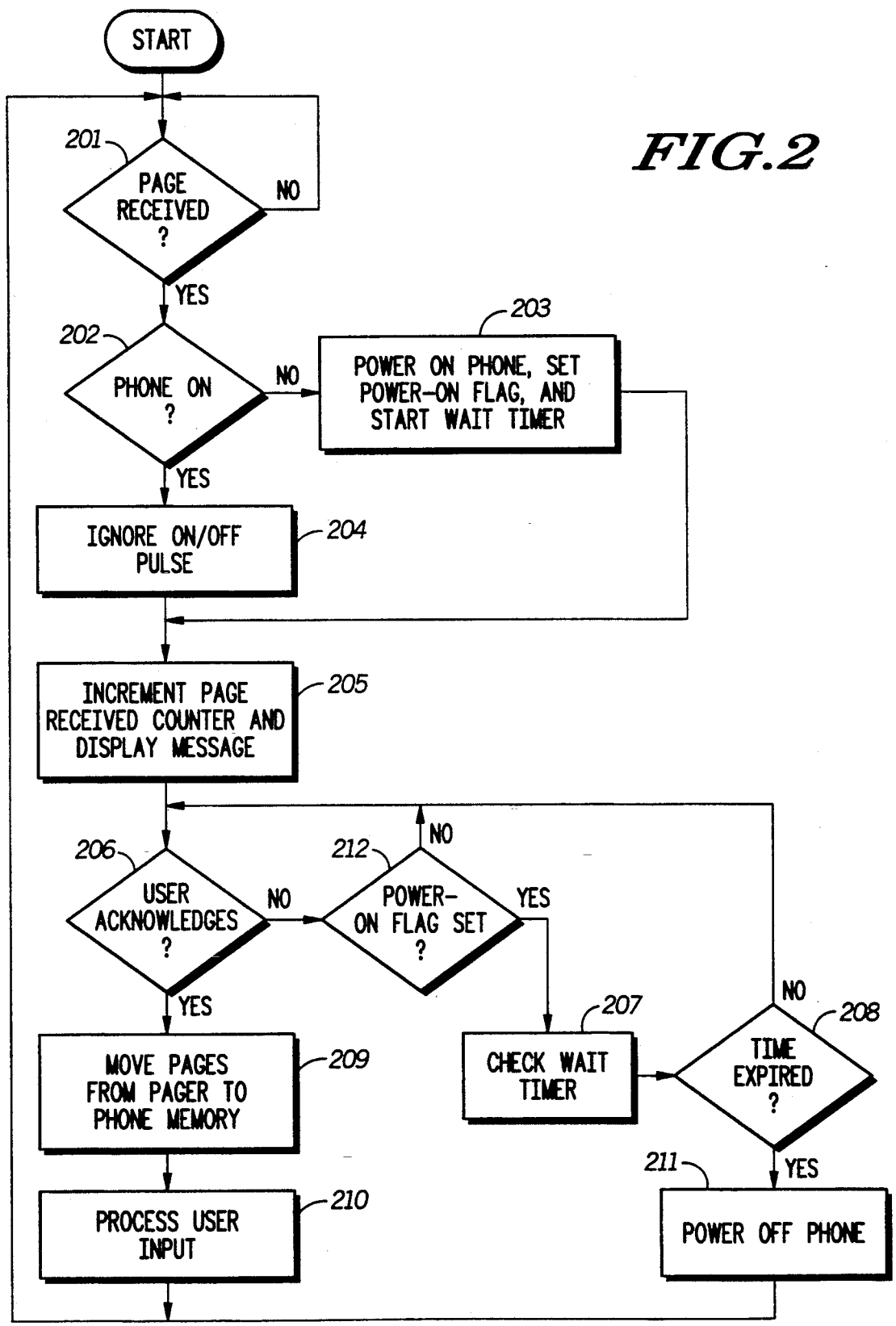
FIG. 2 shows a flow chart for the process executed by the microcomputer of the cellular transceiver 104 in FIG. 1.

The process performed by the microcomputer (124) in the radiotelephone section (104) of the pager and radiotelephone apparatus (100) is illustrated in FIG. 2. When the apparatus (100) receives a page (201), it is stored in the stack of the pager section's microcomputer (121). This page data is in a format that includes characters, such as hyphens, besides the telephone number to be called. After the page data is stored, the PAGE RCVD INDICATION line toggles rapidly which causes the output of the comparator to go low, thereby clocking in a high into the D flip flop (301). The output of the D flip flop (301) sets the page received line (PG RCVD) high and the ON/OFF line low. If the radiotelephone section (104) is off (202) when the page is received, the ON/OFF line going low powers it up (203) in order to inform the user that a page has been received and to give the user a chance to respond to the page. Additionally, a power-on flag is set so that later the radiotelephone section knows that it was powered up by the pager. If the radiotelephone section (104) is already on when the ON/OFF line goes low, this signal is ignored (204) by the 68HC11 microcomputer (124). A page counter in the 68HC11 microcomputer (124) is also incremented (205) enabling the apparatus to keep track of when the stack in the pager section's microcomputer is full.

After the radiotelephone section (104) is on, the appropriate message is displayed in the apparatus' display (128) announcing the page receipt. In addition, an annunication tone is turned on to aurally inform the user of the page. This tone, in the preferred embodiment, is turned on for ten short bursts. If a page is received and the pager section's microcomputer stack is not full, the message "PAGE" is displayed. If the last page received filled up the stack, the message "PAGEFULL" is displayed. Other messages may also be used. For example, if two pages have been received and the pager section's microcomputer stack is not full, the message "2 PAGES" may be displayed. An annunciation tone, different from the normal page received tone, is used to aurally inform the user that the memory is full. If the last page received overflows the stack, making the number of pages received greater than five, the message "OVERFLO" is displayed. This last message will be displayed for each successive page received that overflows the stack.

Once the user knows a page is present, some action by the user (206) is necessary to move the page from the pager section (102) to the radiotelephone memory for display or dialing. If no action is taken by the user within a certain time period (208), six seconds in the preferred embodiment, the power-on flag is checked (212) to determine if the pager turned on the radiotelephone section (104). If the flag is set, the radiotelephone section (104) is powered down (211) to conserve battery power, while the pager section remains on. The flag not set indicates that the user turned on the radiotelephone section (104) and wishes it to remain on.

The user has three options to respond to a page using the keypad (127): a recall pushbutton (RCL) recalls the page into the display of the apparatus, a clear (CLR) pushbutton clears the page from the apparatus display and the radiotelephone section's scratchpad memory, and a send (SND) pushbutton calls the page telephone number stored in scratchpad memory. If the radiotelephone section (104) is powered down without response by the user, as long as the pager section (102) remains powered up, the page data will be stored in the microcomputer (121) stack for later use. When the radiotelephone section (104) is powered up again, "PAGE" will be displayed to inform the user that a page is waiting. Powering down the radiotelephone section (104) with the pager section (102) still powered up will cause a unique tone to be emitted to indicate that the pager section (102) is still on and, therefore, using power.

When the SND, CLR, or RCL pushbuttons are activated (209), all the pages (i.e. telephone numbers) in the pager section's microcomputer stack (121) is moved, one page at a time, from the stack to the shift register (302) in the pager/telephone interface circuitry (108). Initially, a memory pointer in the microcomputer (121) is set to point to the first page in the stack. This page data is moved to the shift register (302) by clocking the page data, on the PGR DATA line, with the bidirectional PGR CLK line. Once the page data is in the shift register (302), the radiotelephone section (104) can use the same clock line (PHN CLK) to clock the page data from the shift register (302) on the data line (PHN DATA) to the non-volatile memory of the microcomputer (124). The PGR RESET line is then pulsed to move the memory pointer to the next page or the next part of the first page and the memory transfer operation is repeated (each page may have two parts). As the page data is clocked into the non-volatile memory of the radiotelephone section (104), it is decoded to get rid of all non-numeric characters. The page counter is decremented after each page is clocked into the radiotelephone section's memory. This continues until the page counter is zero.

Once the telephone numbers of each page are stored in non-volatile memory of the radiotelephone section (104), the pushbutton that was activated is processed (210) to determine what to do with the telephone numbers. No matter which pushbutton was entered, the most recent telephone number will be moved into the radiotelephone section's scratchpad memory while the remaining telephone numbers will remain in the non-volatile memory. If the SND pushbutton was activated, the telephone number in scratchpad memory is called. If the CLR pushbutton was activated, the scratchpad memory will be cleared but the telephone numbers stored in the non-volatile memory will remain for later recall. If the RCL pushbutton was activated, the scratchpad memory will be displayed but not called. Different location in the scratchpad memory can be recalled by activating the RCL pushbutton followed by a numeric pushbutton.

Once all the page data is moved out of the pager section (102), the PAGER ON/OFF line is pulsed high momentarily by the 68HC11 microcomputer (124) to toggle the D flip flop (301), thereby turning the pager section (102) off. This clears the pages stored in the pager section's microcomputer (121). The PAGER ON/OFF line is pulsed again to turn the pager section (102) back on.

One skilled in the art will know that various aspects of the present invention can be changed while still remaining within the scope of the invention. These changes may include the number of pages stored in the microcomputer stack, the number of telephone numbers stored in the radiotelephone section, and the time the radiotelephone section remains on. In summary, a combination radiotelephone/pager apparatus has been shown that permits operation in both radiotelephone and paging systems.

We claim:

1. A method for controlling a combination pager and radiotelephone apparatus, the combination pager and radiotelephone apparatus including pager means for receiving on a paging radio channel a plurality of radio paging signals each having a telephone number with at least one digit, and the combination pager and radiotelephone apparatus including cellular transceiver means being coupled to the pager means through an interface circuit and having at least a recall and send pushbutton for transmitting on radiotelephone channels radiotelephone call signals, the interface circuit having a register for storing the telephone numbers, the method comprising the steps of:

receiving and storing in the paging means a plurality of radio paging signals each having a telephone number with at least one digit;

producing an indication signal when each paging signal has been received in the paging means;

moving the stored telephone numbers from the paging means into the register in response to a control signal;

counting in the cellular transceiver means, in response to the indication signal, the number of paging signals received;

generating the control signal in response to activation of the recall or send pushbutton;

moving the stored telephone numbers from the register to the cellular transceiver means; and transmitting, in response to activation of the send pushbutton, radiotelephone call signals using the last received read-out telephone number in the cellular transceiver means.

2. A pager and radiotelephone apparatus for communicating radiotelephone call signals on radiotelephone channels and receiving paging signals on a paging radio channel, the pager and radiotelephone apparatus comprising:

an antenna for receiving the paging signals and communicating the radiotelephone call signals;

pager means having first filter means coupled to the antenna for receiving paging signals on the paging radio channel and having memory means for storing the received paging signals, each paging signal having a telephone number with at least one digit, the pager means further providing an indication signal when each paging signal has been received, and the pager means being responsive to a first control signal for reading out the stored telephone numbers and being responsive to a second control signal for clearing the memory means;

cellular transceiver means coupled to the pager means, having at least a send pushbutton and a recall pushbutton, and having second filter means coupled to the antenna for receiving radiotelephone call signals on the cellular radio channels, the cellular transceiver means responsive to each indication signal for counting the number of paging signals received, and the cellular transceiver means responsive to activation of the recall pushbutton for generating the first control signal to enable the pager means to read out from the memory means the counted number of stored telephone numbers and thereafter generating the second control signal to enable the pager means to clear the memory means, and the cellular transceiver means responsive to activation of the send pushbutton for transmitting radiotelephone call signals using one of the read out telephone numbers;

a power source for generating a predetermined voltage to power the cellular transceiver means; and interface circuitry, connected to the pager means, the cellular transceiver means, and the power source, the interface circuitry having regulation means for regulating the predetermined voltage to a lower voltage to power the pager means, the interface circuitry additionally having a memory register for temporarily storing the telephone numbers read out from the memory means.

3. The apparatus of claim 2 wherein the antenna is coupled to the first filter means by a transmission line.

4. The apparatus of claim 2 wherein the antenna is coupled to the second filter means by a transmission line.

5. The apparatus of claim 2 wherein the second filter means includes a receive filter and a transmit filter, each filter being coupled to the antenna by a separate transmission line.

* * * * *